United States Patent
Sharma et al.

(10) Patent No.: US 11,372,909 B2
(45) Date of Patent: Jun. 28, 2022

(54) SYSTEM AND METHOD FOR RECOMMENDING BUSINESS SCHOOLS BASED ON ASSESSING PROFILES OF APPLICANTS AND BUSINESS SCHOOLS

(71) Applicant: Kavita Ramnik Shah Mehta, Mumbai (IN)

(72) Inventors: Sanjaya Sharma, Mumbai (IN); Vishal Vachhani, Mumbai (IN); Nikhil Mishra, Mumbai (IN); Madhulika Mazumdar, Mumbai (IN); Nitya Mathew, Mumbai (IN)

(73) Assignee: Kavita Ramnik Shah Mehta, Maharashtra (IN)

( * ) Notice: Subject to any disclaimer, the term of this patent is extended or adjusted under 35 U.S.C. 154(b) by 876 days.

(21) Appl. No.: 16/208,600

(22) Filed: Dec. 4, 2018

(65) Prior Publication Data

US 2020/0073881 A1   Mar. 5, 2020

(30) Foreign Application Priority Data

Aug. 30, 2018   (IN) .............................. 201821032511

(51) Int. Cl.
*G06F 17/00* (2019.01)
*G06F 16/35* (2019.01)
(Continued)

(52) U.S. Cl.
CPC ............ *G06F 16/35* (2019.01); *G06F 16/313* (2019.01); *G06K 9/6215* (2013.01);
(Continued)

(58) Field of Classification Search
CPC ..... G06F 16/35; G06F 16/313; G06K 9/6215; G06K 9/6276; G06K 9/6269; G06N 20/10; G06Q 50/205
See application file for complete search history.

(56) References Cited

U.S. PATENT DOCUMENTS 7,676,034 B1 *   3/2010   Wu ................... H04M 3/42068
                                                        379/265.11
2002/0116253 A1   8/2002   Coyne
(Continued)

OTHER PUBLICATIONS

Jirapanthong, Waraporn, "Classification Model for Selecting Undergraduate Programs", 2009 Eighth International Symposium on Natural Language Processing, DOI: 10.1109/SNLP.2009.5340942, 2009, pp. 89-95 (Year: 2009) (Year: 2009).*

(Continued)

*Primary Examiner* — Laurie A Ries
(74) *Attorney, Agent, or Firm* — Soroker Agmon Nordman (57) ABSTRACT

A system and method for recommending business schools based on an assessment of profiles of applicants and business schools. The method stores datasets pertaining to applicants, business schools, and admissions in a database through a storing module. Then the method reads and transforms the datasets into a structured dataset through a reading module. The method normalizes the datasets to provide a corresponding value to each dataset stored in the database through a data normalization module. The method maps first variables with second variables to compare the profile of the applicant and business school through a variable-mapping module. The method creates multi-label classification model through a multi-label classification module. The method computes a first similarity score between the profiles of the applicants and business schools through a similarity module and second similarity score by utilizing admission transactions data through a transaction-based matrix module.

18 Claims, 5 Drawing Sheets

(51) Int. Cl.
*G06F 16/31* (2019.01)
*G06N 20/10* (2019.01)
*G06K 9/62* (2022.01)
*G06Q 50/20* (2012.01)

(52) U.S. Cl.
CPC ........... *G06K 9/6276* (2013.01); *G06N 20/10* (2019.01); *G06Q 50/205* (2013.01)

(56) References Cited

U.S. PATENT DOCUMENTS

| | | | |
|---|---|---|---|
| 2004/0167786 A1 | 8/2004 | Grace | |
| 2006/0069576 A1 | 3/2006 | Waldorf | |
| 2006/0149563 A1* | 7/2006 | Keller | G09B 5/08 |
| | | | 434/350 |
| 2009/0081629 A1* | 3/2009 | Billmyer | G09B 7/02 |
| | | | 700/89 |
| 2014/0052663 A1 | 2/2014 | Kelley et al. | |
| 2014/0101186 A1 | 4/2014 | Lau | |
| 2016/0092641 A1* | 3/2016 | Delaney | G16Z 99/00 |
| | | | 705/3 |
| 2016/0371279 A1* | 12/2016 | Bai | G06Q 50/01 |
| 2019/0325064 A1* | 10/2019 | Mathiesen | G06F 16/35 |

OTHER PUBLICATIONS

Olugbara, Oludayo O., et al, "Automated Matchmaking to Improve Accuracy of Applicant Selection for University Education System", http://arxiv.org/licenses/nonexclusive-distrib/1.0/, ICT & Society Research Group, Durban University of Technology, Durban, South Africa, pp. 1-14, Jul. 9, 2015 (Year: 2015) (Year: 2015).*

Yocket; A smart tool to suggest list of safe, realistic & ambitious universities, based on YOUR profile; link: https://yocket.in/account/login?redirect=%2Funiversity-courses%2Frecommend.

* cited by examiner

SYSTEM AND METHOD FOR RECOMMENDING BUSINESS SCHOOLS BASED ON ASSESSING PROFILES OF APPLICANTS AND BUSINESS SCHOOLS

The following specification particularly describes the invention and the manner in which it is to be performed.

FIELD OF INVENTION

The present invention relates to recommendation and selection of business schools, in particular to system and method for recommending a plurality of business schools based on an assessment of a plurality of profiles of applicants and a plurality of profiles of business schools.

BACKGROUND OF THE INVENTION

Typically, selecting a business school is often one of the most critical decisions an applicant will make during his/her lifetime. When it comes time to select for business schools, students and their parents are often at a loss of what to do. Many parents and applicants use services of admission consultants, admission guidebooks, and various admission related websites. However, the number of choices is overwhelming, and there is no clear direction on how to get a list of business schools that are best for the applicant. Generally, 20% of application cycle time is spent by applicants on shortlisting business schools to which they want to apply. Further, the colleges recommended may involve bias or subjective evaluation of consultant or may be too aspirational for applicant.

US patent application number 2014/0052663 A1 filed by Brian Kelley et al. discloses a system and a method for or evaluating and selecting business schools based on the user inputs. Further, Brian Kelley et al. reference talks about a system that enables a user to input student's personal information, academic information, desired attributes for a school, desired lifetime attributes to create a student profile. Then the system uses an algorithm to compare the student's profile and targeted life outcome to information collected about schools (e.g., colleges, universities, graduate schools, community colleges, college preparatory schools, vocational schools, etc.) to match the student to one or more schools based on student's compatibility with the school's profile. The system may then output a report to the user including the level of compatibility of the student to each identified school. However, the system disclosed in the Brian Kelley et al. reference is not data-driven and does not utilize machine learning algorithms to match the profiles of the applicants with profiles of the schools or previous successful applicants to provide best-fit recommendations and a rationale.

US patent application number US 2006/0069576 A1 filed by Gregory Waldorf et al. discloses a system and method for identifying colleges for a prospective student to consider attending based on analysis of empirical data which is predictive of the student's approximated satisfaction with attendance at one or more the identified schools. Thus the system and method disclosed in Gregory Waldorf et al. reference are also not driven by intelligent data analysis and identifies colleges based on survey data gathered from a prospective college student.

There is a need for an efficient and effective system and method for recommending a plurality of business schools based on an assessment of a plurality of profiles of applicants and a plurality of profiles of business schools. Further, there is a need for a system and method to provide an accurate list of business schools in real-time which are of best fit to the applicants profile by using machine learning algorithms.

SUMMARY OF THE INVENTION

The present invention mainly solves the technical problems existing in the prior art. In response to these problems, the present invention provides a system and method for recommending a plurality of business schools based on an assessment of a plurality of profiles of applicants and a plurality of profiles of business schools.

An aspect of the present disclosure elates to a method for recommending a plurality of business schools based on an assessment of a plurality of profiles of applicants and a plurality of profiles of business schools. The method comprising the step of storing a plurality of datasets pertaining to a plurality of applicants, a plurality of business schools, and a plurality of admissions in a database through a storing module. The dataset pertaining to the applicant comprises profiles of the applicants having the first plurality of variables. The dataset pertaining to the business schools comprises profiles of the business schools having a second plurality of variables. The dataset pertaining to the admissions comprises admission data of the applicants in the plurality of business schools having data of business schools preferred by the applicants, interview status data of the applicant, and an outcome data.

Then the method includes the step of reading the datasets stored in the database to transform into a structured dataset through a reading module. The structured datasets are subjected to a training operation by a machine learning module to provide a predictive model. The method then includes the step of normalizing the datasets and providing a corresponding value to each dataset stored in the database through a data normalization module. The corresponding value provided to each dataset is rescaled to a range of 0 to 1.

The method includes the step of mapping the first plurality of variables with the second plurality of variables to compare the profile of the applicant and profile of the business school through a variable-mapping module. The variable-mapping module utilizes support vector machine regression (SVR) model to learn a plurality of weights of the first plurality of variables and map the first plurality of variables to the second plurality of variables.

Further, the method includes the step of creating multi-label classification model by considering the profile of a prospect applicant as an input variable and the profile of the Business School of the prospect applicant considered as a target variable through a multi-label classification module.

Then the method includes the step of computing a first similarity score between the plurality of profiles of the applicants and the plurality of profiles of the business schools through a similarity module. The similarity module utilizes a K-nearest Neighbor algorithm to extract data pertaining to similar applicants and business schools.

Furthermore, the method includes the step of computing a second similarity score by utilizing data pertaining to a plurality of admission transactions accomplished by the business schools through a transaction-based matrix module. The transaction-based matrix module utilizes the K-nearest Neighbor algorithm to extract the data pertaining to similar applicants and business schools.

The method further includes a step of providing a priority order of the recommended business schools by utilizing a second plurality of algorithms.

In an aspect, tie variable-mapping module utilizes a predefined mapping dictionary for mapping the first plurality of variables to the second plurality of variables.

In an aspect, the similarity module comprises a first similarity matrices and a second similarity matrices, wherein the first similarity matrices for applicants comprises a similarity score for each profile of the applicant and the second similarity matrices for each profile of the business school.

In an aspect, the transaction-based matrix module comprises a first plurality of algorithms to assign similar business schools to the similar applicants.

An aspect of the present disclosure relates to a device in a network. The device includes a non-transitory storage device having embodied therein one or more routines operable to recommend a plurality of business schools based on an assessment of a plurality of profiles of applicants and a plurality of profiles of business schools. The one or more routines include a storing module, a reading module, a data normalization module, a variable-mapping module, a multi-label classification module, a similarity module, and a transaction-based matrix module.

The storing module is configured to store a plurality of datasets pertaining to a plurality of applicants, a plurality of business schools, and a plurality of admissions in a database. The dataset pertaining to the applicant comprises profiles of the applicants having the first plurality of variables. The dataset pertaining to the business schools comprises profiles of the business schools having a second plurality of variables. The dataset pertaining to the admissions comprises admission data of the applicants in the plurality of business schools having data of business schools preferred by the applicants, interview status data of the applicant, and an outcome data. The reading module is configured to read the datasets stored in the database to transform into a structured dataset. The structured datasets are subjected to a training operation by a machine learning module to provide a predictive model. The data noralization module configured to normalize the datasets and providing a corresponding value to each dataset stored in the database. The corresponding value provided to each dataset is resealed to a range of 0 to 1.

The variable-mapping module is configured to map the first plurality of variables with the second plurality of variables to compare the profile of the applicant and profile of the business school. The variable-mapping module utilizes support vector machine regression (SVR) model to learn a plurality of weights of the first plurality of variables and map the first plurality of variables to the second plurality of variables. The multi-label classification module is configured to create multi-label classification model by considering the profile of a prospect applicant as an input variable and the profile of the business school of the prospect applicant considered as a target variable.

The similarity module is configured to compute a first similarity score between the plurality of profiles of the applicants and the plurality of profiles of the business schools. The similarity module utilizes a K-nearest Neighbor algorithm to extract data pertaining to similar applicants and business schools.

The transaction-based matrix module is configured to compute a second similarity score by utilizing data pertaining to a plurality of admission transactions accomplished by the business schools. The transaction-based matrix module utilizes the K-nearest Neighbor algorithm to extract the data pertaining to similar applicants and business schools.

An aspect of the present disclosure relates to recommending a plurality of business schools based on an evaluation of a plurality of profiles of applicants and a plurality of profiles of business schools. The system includes a processor and a memory. The memory stores machine-readable instructions that when executed by the processor cause the processor to store a plurality of datasets pertaining to a plurality of applicants, a plurality of business schools, and a plurality of admissions in, a database through a storing module. The dataset pertaining to the applicant comprises profiles of the applicants having the first plurality of variables. The dataset pertaining to the business schools comprises profiles of the schools having a second plurality of variables. The dataset pertaining to the admissions comprises admission data of the applicants in the plurality of business schools having data of business schools preferred by the applicants, interview status data of the applicant, and an outcome data. The processor is configured to read the datasets stored in the database to transform into a structured dataset through a reading module. The structured datasets are subjected to a training operation by a machine learning module to provide a predictive model.

Then the processor is configured to normalize the datasets and providing a corresponding value to each dataset stored in the database through a data normalization module. The corresponding value provided to each dataset is resealed to a range of 0 to 1. The processor is configured to map the first plurality of variables with the second plurality of variables to compare the profile of the applicant and profile of the business school through a variable-mapping module.

The variable-mapping module utilizes support vector machine regression (SVR) model to learn a plurality of weights of the first plurality of variables and map the first plurality of variables to the second plurality of variables. Further, the processor is configured to create multi-label classification model by considering the profile of a prospect applicant as an input variable and the profile of the business school of the prospect applicant considered as a target variable through a multi-label classification module. Then the processor is configured to compute a first similarity score between the plurality of profiles of the applicants and the plurality of profiles of the business schools through a similarity module.

The similarity module utilizes a K-nearest Neighbor algorithm to extract data pertaining to similar applicants and business schools. Furthermore, the processor is configured to compute a second similarity score by utilizing data pertaining to a plurality of admission transactions accomplished by the business schools through a transaction-based matrix module. The transaction-based matrix module utilizes the K-nearest Neighbor algorithm to extract the data pertaining to similar applicants and business schools.

Accordingly, one advantage of the present invention is that it enables the applicants and admission consultants to make the right choices about selecting relevant business schools and thereby helps to improve the success rates.

Accordingly, one advantage of the present invention is that it provides an accurate list of schools real-time which are of best fit to the applicant's profile using machine learning classification algorithms.

Accordingly, one advantage of the present invention is that it provides a quantified percentage score of getting an interview call from the respective business schools for an applicant.

Accordingly, one advantage of the present invention is that it enables the applicants and consultants to compare the business schools. Additionally, the consultants can compare the profiles of the applicants by using machine learning algorithms Accordingly, one advantage of the present invention is that it enables the consultants to add, edit, and monitor their applicants and their school choices. Also, the consultant can improve their knowledge of the applicant-school match by using a gamification module on a continuous basis.

Accordingly, one advantage of the present invention is that it enables the consultants to track annual TRP records on the school-specific data such as application cycle, number of applicants applied, number of applicants interviewed, number of applicants admitted, number of applicants enrolled, and applicant-specific data such as track records of the applicants and transaction history of the applicants.

Accordingly, one advantage of the present invention is that it enables the consultant to track school trends such as acceptance rate, yield, incoming class size, average GMAT score, etc.

Other features of embodiments of the present disclosure will be apparent from accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. As we realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DESCRIPTION

Detailed Description of the Illustrative Embodiments

The present disclosure is best understood with reference to the detailed figures and description set forth herein.

Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

Systems and methods are disclosed for recommending a plurality of business schools based on an assessment of a plurality of profiles of applicants and a plurality of profiles of business schools. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

The present invention discloses a system and method whereby profiles of the applicants and business schools are created. Further, the present enables the user (consultant) to monitor the admission by adding editing and monitoring the applicant's profile and their school choices. Further, the present system enables the applicant and the consultant to view best-fit, and real-time personalized recommendations of business schools generated through machine learning procedures. Further, the present system classifies on an ordinal scale of the chance of the applicant getting an interview from each of the recommended business schools. Additionally, the consultant can, train themselves and improve their knowledge of the applicant-school match through a scalable gamified intervention.

The present system provides a list of business schools with ranking. The best probable business school list is provided for an applicant, considering the applicant's profile and using an ensemble of various machine learning algorithms. Further, the present system quantifies the percentage chance of getting an interview call from the respective business schools for an applicant. It considers the profiles of applicant and business school from the recommendation list. Then the present system provides a list of applicants similar to a particular applicant based on attributes related to the profile of the applicants. A distance-based measure is used to compute the similarity matrix of the applicants. For a target business school, the present system provides a list of business schools similar to the target business school considering the profile attributes and the transaction history related to the business schools. A transaction- and profile-based algorithms are used to provide a list of similar business schools.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes methods, and/or operating systems described herein are for illustrative purposes and, thus, are not intended to be limited to any particular name.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored, and that does not include carrier waves and/or transitory electronic signals propagating wirelessly or over wired connections. Examples of a non-transitory medium may include but are not limited to, a magnetic disk or tape, optical storage media such as compact disk (CD) or versatile digital disk (DVD), flash memory, memory or memory devices.

Figure 1:
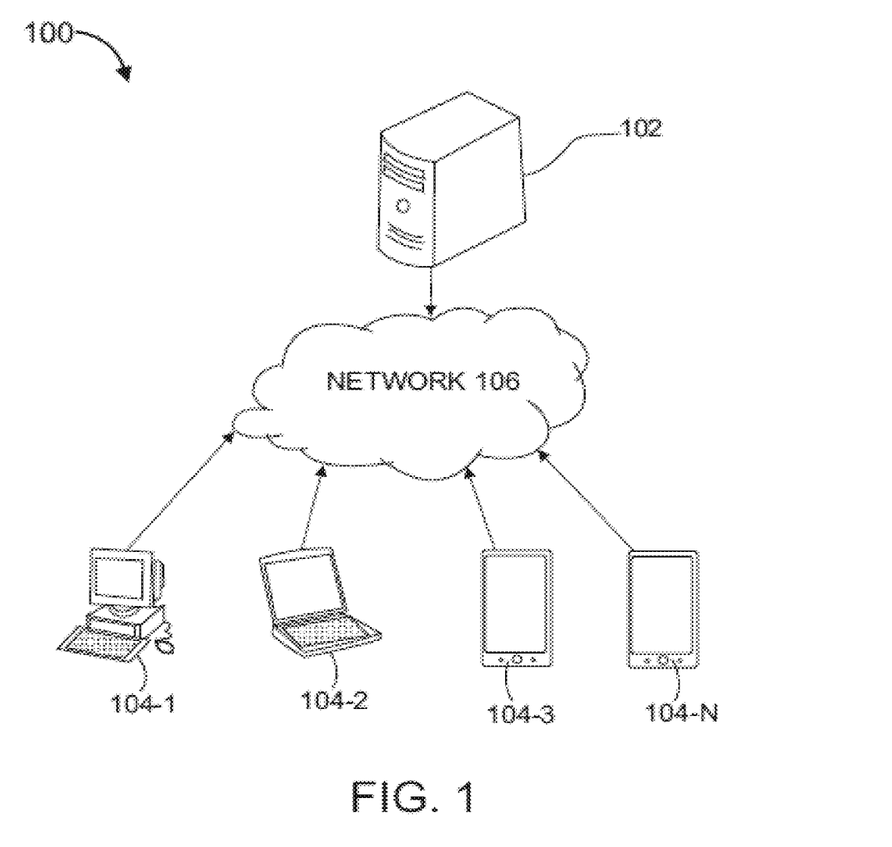
FIG. 1 illustrates a network implementation of the present system and method to recommend a plurality of business schools based on an assessment of a plurality of profiles of applicants and a plurality of profiles of business schools, in accordance with an embodiment of the present subject matter.

FIG. 1 illustrates a network implementation 100 of the present system and method to recommend a plurality of business schools based on an assessment of a plurality of profiles of applicants and a plurality of profiles of business schools, in accordance with an embodiment of the present subject matter. Examples of an applicant including but not limited to a student or any person who wish to get admission in a business school or a university or other place of higher education. Although the present subject matter is explained considering that the present system 102 is implemented on a server, it may be understood that the present system 102 may also be implemented in a variety of computing systems, such as a laptop computer, a desktop computer, a notebook, a workstation, a mainframe computer, a server, Amazon elastic compute cloud (Amazon EC2), a network server, and the like. It will be understood that the present system 102 may be accessed by multiple users through one or more computing devices 104-1, 104-2 . . . 104-N, collectively referred to as computing unit 104 hereinafter, or applications residing on the computing unit 104. Examples of the computing unit 104 may include but are not limited to, a portable computer, a personal digital assistant, a handheld or mobile device, smart devices, and a workstation. The computing units 104 are communicatively accessible to the present system 102 through a network 106.

In one implementation, the network 106 may be a wireless network, a wired network or a combination thereof. The network 106 can be implemented as, one of the different types of networks, such as an intranet, local area network (LAN), wide area network (WAN), the Internet, and the like The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
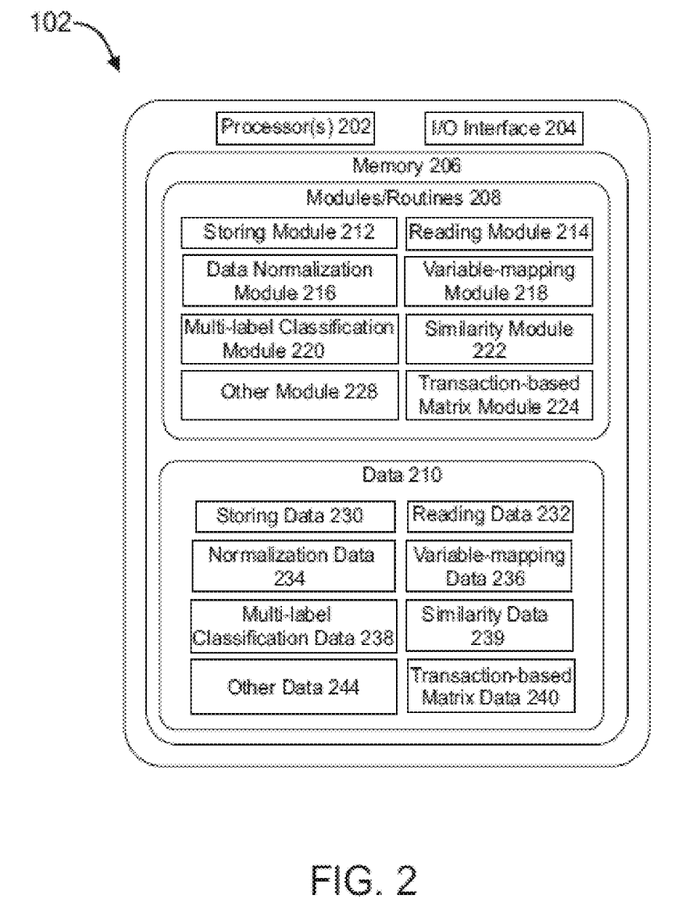
FIG. 2 illustrates a block diagram of the present system to recommend a plurality of business schools based on an assessment of a plurality of profiles of applicants and a plurality of profiles of business schools, in accordance with an embodiment of the present subject matter.

FIG. 2 illustrates a block diagram 200 of the present system to recommend a plurality of business schools based on an assessment of a plurality of profiles of applicants and a plurality of profiles of business schools, in accordance with an embodiment of the present subject matter. The system 102 may include at least one processor 202, an input/output (I/O) interface 204, and a memory 206.

The processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the computing unit 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access, memory (DRAM), and/or non-volatile memory, such as read-only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation the modules 208 may include a storing module 212, a reading module 214, a data normalization module 218, a variable-mapping module 218, a multi-label classification module 220, a similarity module 222, and a transaction-based matrix module 224, and other module 228. The other modules 222 may include programs or coded instructions that supplement applications and functions of the system 102.

The data 210, amongst other things, serves as a repository for storing data processed, received, and generated by one or more of the modules 208. The data 210 may also include a storing data 230, a reading data 232, a normalization data 234, a variable-mapping data 236, a multi-label classification data 238, a similarity data 239, a transaction-based matrix data 240, and other data 244. The other data 244 may include data generated as a result of the execution of one or more modules in the other module 228.

In one implementation, the storing module 212 is configured to store a plurality of datasets pertaining to a plurality of applicants, a plurality of business schools, and a plurality of admissions in a database. The dataset pertaining to the applicant comprises profiles of the applicants having the first plurality of variables. In an embodiment, the first plurality of variables are prefixed as at least 41 variables. The dataset pertaining to the business schools comprises profiles of the business schools having a second plurality of variables. In an embodiment, the second plurality of variables are prefixed as at least 15 variables. The dataset pertaining to the admissions comprises admission data of the applicants in the plurality of business schools having data of business schools preferred by the applicants, interview status data of the applicant, and an outcome data. The reading module 214 is configured to read the datasets stored in the database to transform into a structured dataset. The structured datasets are subjected to a training operation by a machine learning module to provide predictive model. The machine learning module constructs algorithms that can learn from and make predictions on datasets. Such algorithms work by making data-driven predictions or decisions, by building a mathematical model from input data It mainly divided into two phases a training phase and a production phase.

In training phase, the mathematical model utilizes a set of examples to fit the parameter of the machine learning module. The mathematical model is trained on the training dataset using a supervised learning method like Support Vector Machine (SVM). The training dataset often consists of pairs of an input vector and the corresponding answer vector or scalar, which is commonly denoted as the target. Based on the training and target vector, the model parameters are adjusted. To build the supervised models, the present system uses applicant and Business School profiles along with the admission data. Every time the system restarts, the whole recommender engine building procedure repeats. In the production phase, the mathematical model is used for the testing data to provide an unbiased prediction or decision. In operation, the applicant's profile is fit to the built mathematical model to get the recommended business school list.

The data normalization module 216 is configured to normalize the datasets and providing a corresponding value to each dataset stored in the database. The corresponding value provided to each dataset is rescaled to a range of 0 to 1. The variable-mapping module 218 is configured to map the first plurality of variables with the second plurality of variables to compare the profile of the applicant and profile of the business school. The variable-mapping module 218 utilizes support vector machine regression (SVR) model to learn a plurality of weights of the first plurality of variables and map the first plurality of variables to the second plurality of variables, in an embodiment, the variable-mapping module 218 utilizes a predefined mapping dictionary for mapping the first plurality of variables to the second plurality of variables.

The multi-label classification module 220 is configured to create multi-label classification model by considering the profile of a prospect applicant as an input variable and the profile of the business school of the prospect applicant considered as a target variable. The similarity module 222 is configured to compute a first similarity score between the plurality of profiles of the applicants and the plurality of profiles of the business schools. The similarity module 222 utilizes a K-nearest Neighbor algorithm to extract data pertaining to similar applicants and business schools. In an embodiment, the similarity module 222 comprises first similarity matrices and a second similarity matrices, wherein the first similarity matrices for applicants comprises a similarity score for each profile of the applicant and the second similarity matrices for each profile of the business school. In an embodiment, the similarity module 222 utilizes a measure of similarity for computing the first similarity score.

The transaction-based matrix module 224 is configured to compute a second similarity score by utilizing data pertaining to a plurality of admission transactions accomplished by the business schools. The transaction-based matrix module 224 utilizes the K-nearest Neighbor algorithm to extract the data pertaining to similar applicants and business schools. In an embodiment, the transaction-based matrix module 224 comprises a first plurality of algorithms to assign similar business schools to the similar applicants. Further, the second plurality of algorithms provides a priority order of the recommended business schools. In an embodiment, the first plurality of algorithms includes but not limited to Apriori Algorithm, K-Nearest Neighbor algorithm, and Multi-label Classification algorithm. Typically, Apriori algorithm is used for frequent item set mining and association rule learning over transactional databases. Apriori algorithm proceeds by identifying the frequent individual items in the database. Apriori algorithm uses a "bottom-up" approach, where frequent subsets are extended one item at a time (a step is known as candidate generation), and groups of candidates are tested against the data. The algorithm terminates when no further successful extensions are found.

The K-Nearest Neighbor algorithm is a simple algorithm that stores all available cases and classifies new cases based on a similarity measure (e.g., distance functions). A case is classified by a majority vote of its Neighbors, with the case being assigned to the class most common amongst its K-nearest Neighbors measured by a distance function. Further, the multi-label classification algorithm assigns each sample a set of target labels. This can be thought of as predicting properties of a data-point that are not mutually exclusive, such as topics that are relevant for a document.

In an embodiment, the present system utilizes profile-based algorithms to consider the individual profiles and their attributes. To compute the profile-based similarity, the present system uses cosine similarity which is a distance-based measure. In all profile-based algorithms, K-nearest Neighbors algorithm is used to find the best-matched outcome.

The profile-based similarity is considered for the following: 1) Applicant profile matching considers the applicant profile attributes, 2) School profile matching considers the school profile attributes. 3) Applicant-school matching considers both the applicant and school profile attributes.

Figure 3:
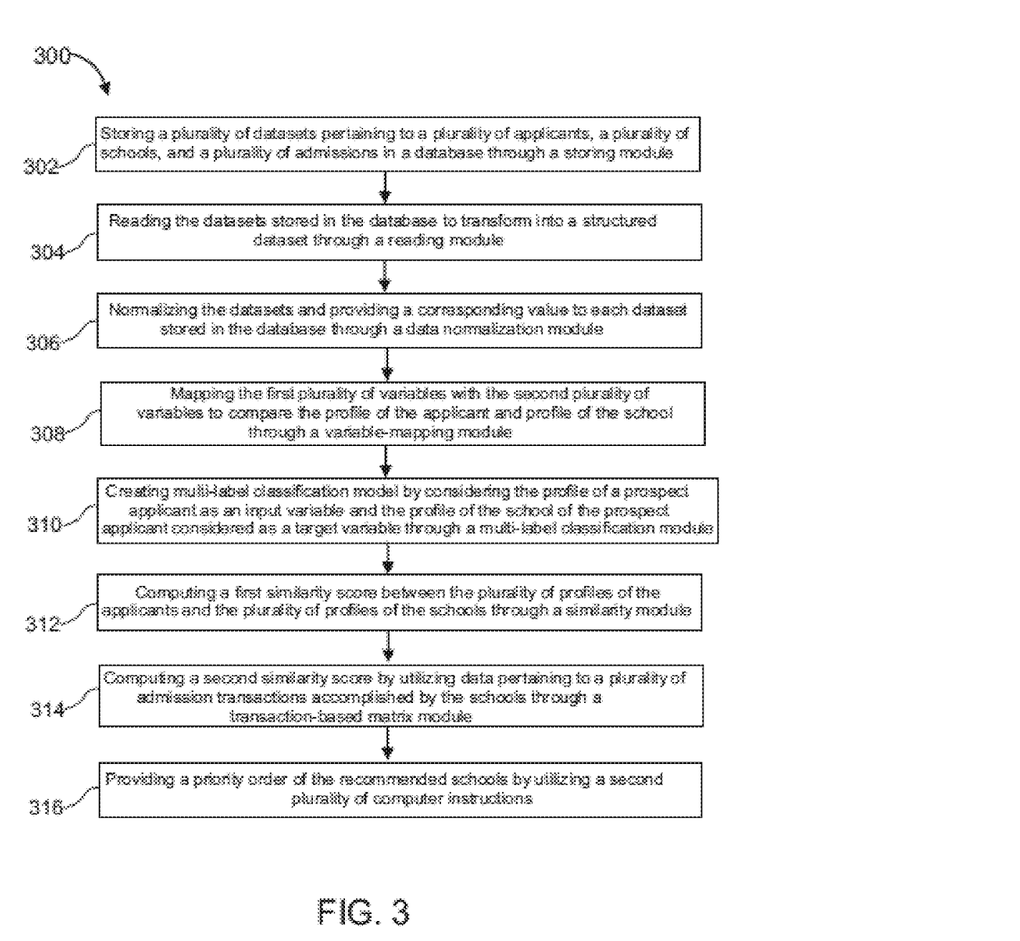
FIG. 3 illustrates a flowchart of the method for recommending a plurality of business schools based on an assessment of a plurality of profiles of applicants and a plurality of profiles of business schools, in accordance with at least one embodiment.

FIG. 3 illustrates a flowchart 300 of the method for recommending a plurality of business schools based on an assessment of a plurality of profiles of applicants and a plurality of profiles of business schools in accordance with at least one embodiment. The method initiates with a step 302 of storing a plurality of datasets pertaining to a plurality of applicants, a plurality of business schools, and a plurality of admissions in a database through a storing module. The dataset pertaining to the applicant comprises profiles of the applicants having the first plurality of variables. The dataset pertaining to the business schools comprises profiles of the business schools having a second plurality of variables. The dataset pertaining to the admissions comprises admission data of the applicants in the plurality of business schools having data of business schools preferred by the applicants, interview status data of the applicant, and an outcome data. Then the method includes the step 304 of reading the datasets stored in the database to transform into a structured dataset through a reading module. The structured datasets are subjected to a training operation by a machine learning module to provide a predictive model. The method then includes the step 306 of normalizing the datasets and providing a corresponding value to each dataset stored in the database through a data normalization module.

The corresponding value provided to each dataset is resealed to a range of 0 to 1. The method includes the step 308 of mapping the first plurality of variables with the second plurality of variables to compare the profile of the applicant and profile of the business school through a variable-mapping module. The variable-mapping module utilizes support vector machine regression (SVR) model to learn a plurality of weights of the first plurality of variables and map the first plurality of variables to the second plurality of variables. Further, the method includes the step 310 of creating multi-label classification model by considering the profile of a prospect applicant as an input variable and the profile of the business school of the prospect applicant considered as a target variable through a multi-label classification module. Then the method includes the step 312 of computing a first similarity score between the plurality of profiles of the applicants and the plurality of profiles of the business schools through a similarity module. The similarity module utilizes a K-nearest Neighbor algorithm to extract data pertaining to similar applicants and business schools. Furthermore, the method includes the step 314 of computing a second similarity score by utilizing data pertaining to a plurality of admission transactions accomplished by the business schools through a transaction-based matrix module. The transaction-based matrix module utilizes the K-nearest Neighbor algorithm to extract the data pertaining to similar applicants and business schools. The method further includes a step 316 of providing a priority order of the recommended business schools by utilizing a second plurality of algorithms.

Figure 4:
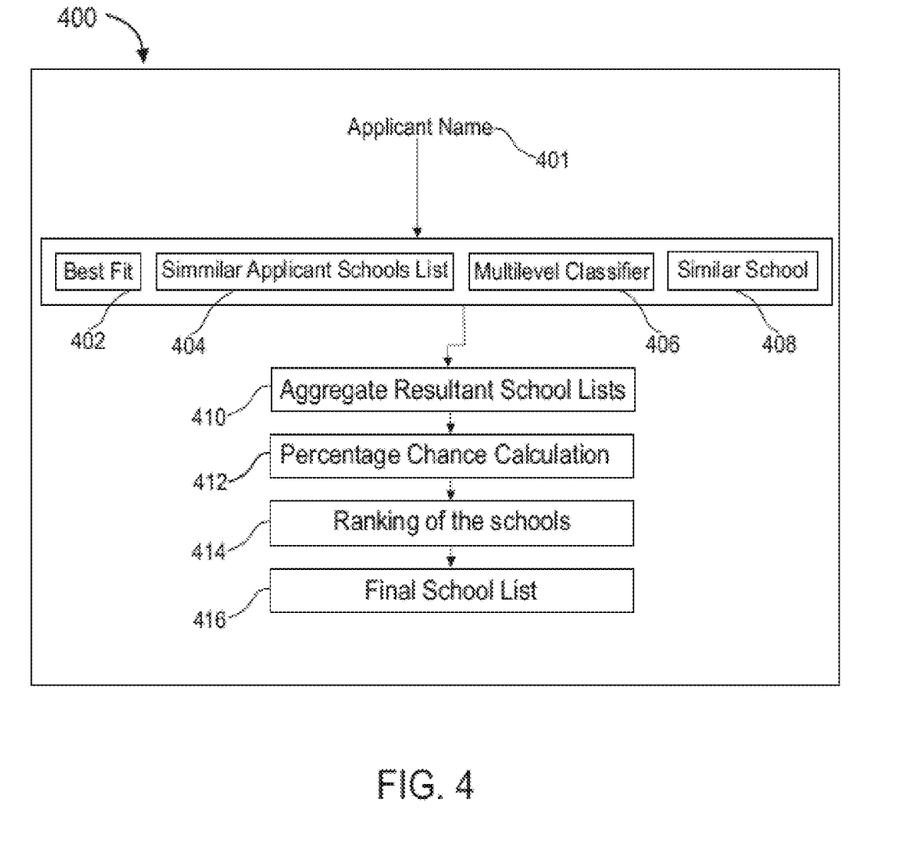
FIG. 4 illustrates a block diagram of the recommender engine, in accordance with at least one embodiment.

FIG. 4 illustrates a block diagram 400 of the recommender engine, in accordance with at least one embodiment. For a particular applicant 401, the recommender engine considers four different algorithms and aggregates the school lists. The ranking is performed on the aggregated business school list. The four algorithms are best-fit algorithm 402, similar applicant school algorithm 404, multi-label classification algorithm 406 and similar schools algorithm 408.

The best-fit algorithm 402 is a profile-based algorithm that can recommend business schools without considering the transaction data. Due to which the present system can avoid the cold start problem. This algorithm works by creating a mapping from 41 variables or attributes of applicants to 15 school variables. The weights of each of the 41 applicant variables to achieve the mapping are learned using Support Vector Regression. A distance-based similarity measure such as Euclidean distance is used to find the best applicant-school matching. To get the best match business schools, the present system utilizes K-Nearest Neighbor algorithm. The number of business schools provided by the algorithm as the outcome is controlled in the configuration file as presented in Table 1: Configurable Variables.

The similar applicant school algorithm 404 computes similar applicants of the considered applicant by using distance-based similarity measure on applicant profile variables. K-nearest Neighbor's algorithm is used to get the most similar applicants for the applicant under consideration. The considered K for this case is configurable and mentioned in Table 1: Configurable Variables. In this method, recommended business schools are those business schools where these similar applicants have applied and got an interview call.

The multi-label classification algorithm 406 projects a matching problem as a classification problem. A classification model is built using applicant profile and its related historical admission data. In testing, the model predicts a sequence of business schools and labels for the applicant under consideration. The similar schools algorithm 408 extracts the similar business schools using r action-based apriori algorithm. The number of similar business schools that need to be considered is configuration is mentioned in Table 1: Configurable Variables. The list of the recommended business schools 416 from all the sources are aggregated 410 and ranked 414 based on the frequency count. The present system quantifies the percentage chance 412 of getting an interview call from the respective business schools for the applicant.

To compute the interview chance for the recommended business schools, the present system considers the profile of the applicant under consideration and the profile of the business schools from the school recommendation list. Then the present system creates a mapping from 44 variables (instead of 41 variables) of applicants to 15 school variables. To find the applicant-school match up the score, the present system uses Euclidean Distance. Interview chance of an applicant in a school is the Euclidean Distance between the applicant and the school profile variables. The additional profile variables of the applicants which are used in this calculation are Gender, College Prestige and Percent GPA.

For generating similar applicant, the present system considers a profile-based method to avoid the cold start problem. For a given applicant, considering the 41 profile variables, the present system has built a symmetric similarity matrix. In this matrix, each cell represents the distance or dissimilarity between respective applicants. Each profile variables of the applicants are assigned with a weight, used while calculating the distance between the variables. The present system uses a cosine similarity to compute the similarity between the applicants. To get the most similar applicants for the applicant under consideration, the present system uses KNN algorithm. K is configurable in this case and mention in Table 1: Configurable Variables.

For generating similar business school, both transaction and profile based methods are considered. In the transaction-based method, the present system uses the transaction-based Apriori algorithm. A matrix is built using the admission data, i.e., transaction data in which each cell of the matrix represents how many times the respective business schools are applied together, i.e., applied by the same applicant. It is based on the intuition that an applicant applies to the business schools those have similarity in their profiles. The present system extracts the most similar business schools for the business school under consideration by using KNN algorithm. K is configurable in this case and mention in Table 1: Configurable Variables. In the profile-based method, the school profiles variables are considered. For a given applicant, considering the 15 profile variables, the present system has built a symmetric similarity matrix.

In this matrix, each cell represents the distance or dissimilarity between respective business schools. Each profile variables of the business schools are assigned with a weight which is used which used while calculating the distance between the variables. The present system uses cosine similarity to compute the similarity between the business schools. To get the most similar business schools for the school under consideration, the present system uses KNN algorithm. K is configurable in this case and mention in Table 1: Configurable Variables To make the recommender engine flexible following variables are kept as a configurable. Table 1: Configurable Variables presents the umber of business schools from different algorithms and defined M7 schools. In Table 1, positive Transaction means the transactions which have a Positive Interview Call. Applicant Profile is defined by considering the applicants' Personal, Academic, Work Experience and Personality Trait.

TABLE 1

| Configurable Variables | |
| --- | --- |
| #SimApplicants | 3 |
| #SimilarSchools (Apriori Algo) | 2 |
| #Best Fit | 3 |
| #Min Positive Transaction | 6 |
| M7 Schools | Kellogg, Chicago Booth, Wharton(PHL), Harvard Business School, MIT Sloan, Stanford GSB, Columbia Business School |

Table 2: Applicant's Profile Variables presents a description of these variables. The values of these variables determine the strength of an applicant.

TABLE 2

| applicant's profile variables | |
| --- | --- |
| Applicant_Personal_Profile | Represents applicant's background (e.g., whether the applicant has a political background) |
| Applicant_Academic_Profile | Indicates academic background such as the prestige of applicants' previous school |
| Applicant_Work_Experience_Profile | Describes applicant's work experience (e.g., his team management experience) |

TABLE 2-continued

| applicant's profile variables | |
| --- | --- |
| Applicant_Personality_Traits_Profile | Indicates the personality features of applicants (e.g., business mindset) |

College Profile is defined by the three variables presented in Table 3: School's Profile Variables. As shown in Table 3: School's Profile Variables, academic, culture, location, and placement define the strength of the school profile.

TABLE 3

| school's profile variables | |
| --- | --- |
| College_Academics | Considers different aspects of the teaching culture of the school (e.g., case-study or experiential) |
| College_Culture | Indicates the culture of the school (e.g., collaboration, social impact) |
| College_Placement | Covers placement-related variables in various industries or sectors (e.g., consulting, technology) |

The TRP provides all the applicant and college profile variables along with configurable values (refer Table 1: Configurable Variables). The school profile values (college_profile_vars) in the configuration file are used to compute similar schools. Each of the variables under this is assigned with a predefined weight (provided by TRP). Similarly, applicant profile values (applicant_profile_vars) in the configuration file is used in similar applicant computation. Each variable under this is assigned with a predefined weight provided by TRP. The present system uses a predefined threshold in school recommendation matches based on a percentage of chance of getting an interview call.

These are categorized as:

Safety ($<=1.1$); Reach ($<=1.8$); Dream ($>1.8$)

Figure 5:
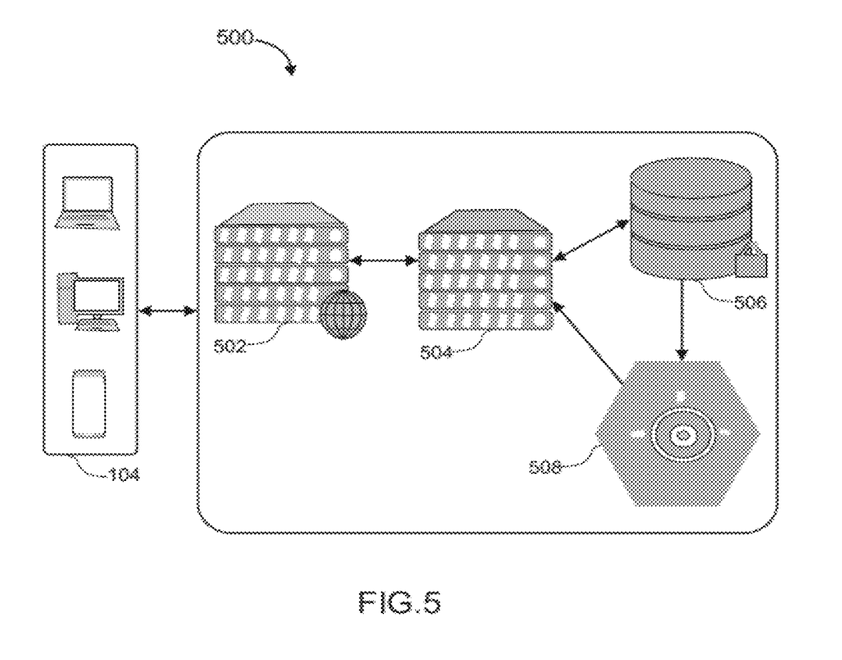
FIG. 5 illustrates are architecture of the present system, in accordance with at least one embodiment.

The recommendation match threshold is kept as configurable in the configuration file. FIG. 5 illustrates an architecture 500 of the present system, in accordance with at least one embodiment. The present system can be utilized as a web application or a mobile application. To provide a flexible, easy and scalable solution, the application is categorized into multiple layers such as front-end web application 502, service application 504, database 506, and a recommender engine 508. The front-end web application layer 502 is responsible for handling UI/UX aspect of the present system. The service application layer 504 handles API endpoints for the application, their method description and payload details to connect with the application. It handles business logic and connecting with any third-party services as and when needed. The application data is accessed through the database access layer 506 to perform all the operations. In an exemplary embodiment, the database utilized by the present invention is MongoDB. The MongoDB is a NoSQL database shuns the relational database's table-based structure to adapt JSON-like documents that have dynamic schemas which it calls BSON. This allows for faster and easier data integration. The recommender engine 508 recommends a plurality of schools based on an evaluation of a plurality of profiles of applicants and a plurality of profiles of schools.

Thus the present system and method provide an efficient, simpler and more elegant framework for applicants to select study programs that are the best fit based on their background, profile and goals thereby empowers the applicants to maximize their potential and improve outcomes. Further, the machine learning algorithms used in the present system and method remove the bias created by consultants' evaluation and consider the actual data from the last five years. The present system and method provide personalized real-time school recommendations supported by a rationale. Additionally the accuracy of the recommendations improves as transactions (applicant transactions) increase. The present system and method provide a web-based or smart-phone based application which can be utilized by independent education consultants, undergraduate schools, business schools, application management companies, etc.

While embodiments of the present disclosure have been illustrated and described, it will be clear that the disclosure is not limited to these embodiments only. Numerous modifications changes, variations, substitutions, and equivalents will be apparent to those skilled in the art, without departing from the scope of the disclosure, as described in the claims.

The invention claimed is:

1. A method for recommending a plurality of business schools based on an assessment of a plurality of profiles of applicants and a plurality of profiles of business schools, the method comprising steps of:
storing, by one or more processors, a plurality of datasets pertaining to a plurality of applicants, a plurality of business schools, and a plurality of admissions in a database through a storing module, wherein the dataset pertaining to the applicant comprises profiles of the applicants having a first plurality of variables, wherein the dataset pertaining to the business schools comprises profiles of the business schools having a second plurality of variables, wherein the dataset pertaining to the admissions comprises admission data of the applicants in the plurality of business schools having data of business schools preferred by the applicants, interview status data of the applicant, and an outcome data;
reading, by one or more processors, the datasets stored in the database to transform into a structured dataset through a reading module, wherein the structured datasets re subjected to a training operation by a machine learning module to provide a predictive model;
normalizing, by one or more processors, the datasets and providing a corresponding value to each dataset stored in the database through a data normalization module, wherein the corresponding value provided to each dataset is rescaled to a range of 0 to 1;
mapping, by one or more processors, the first plurality of variables with the second plurality of variables to compare the profile of the applicant and profile of the business school through a variable-mapping module, wherein the variable-mapping module utilizes support vector machine regression (SVR) model to learn a plurality of weights of the first plurality of variables and map the first plurality of variables to the second plurality of variables;
creating, by one or more processors, multi-label classification model by considering the profile of a prospect applicant as an input variable and the profile of the business school of the prospect applicant considered as a target variable through a multi-label classification module;
computing, by one or more processors, a first similarity score between the plurality of profiles of the applicants and the plurality of profiles of the business schools through a similarity module, wherein the similarity module utilizes a K-nearest Neighbor algorithm to extract data pertaining to similar applicants and business schools; and
computing, by one or more processors, a second similarity score by utilizing data pertaining to a plurality of admission transactions accomplished by the business schools through a transaction-based matrix module, wherein the transaction-based matrix module utilizes the K-nearest Neighbor algorithm to extract the data pertaining to similar applicants and business schools.

2. The method according to claim 1, wherein the variable-mapping module utilizes a predefined mapping dictionary for mapping the first plurality of variables to the second plurality of variables.

3. The method according to claim 1, wherein the similarity module comprises a first similarity matrices and a second similarity matrices, wherein the first similarity matrices for applicants comprises a similarity score for each profile of the applicant and the second similarity matrices for each profile of the business school.

4. The method according to claim 1, wherein the similarity module utilizes a measure of similarity for computing the first similarity score.

5. The method according to claim 1, wherein the transaction-based matrix module comprises a first plurality of algorithms to assign similar business schools to the similar applicants.

6. The method according to claim 1, further comprises a step of providing, by one or more processors, a priority order of the recommended business schools by utilizing a second plurality of algorithms.

7. A system to recommend a plurality of business schools based on an evaluation of a plurality of profiles of applicants and a plurality of profiles of business schools, the system comprises:
a processor; and a memory to store machine readable instructions that when executed by the processor cause the processor to:
store a plurality of datasets pertaining to a plurality of applicants, a plurality of business schools, and a plurality of admissions in a database through a storing module, wherein the dataset pertaining to the applicant comprises profiles of the applicants having a first plurality of variables, wherein the dataset pertaining to the business schools comprises profiles of the business schools having a second plurality of variables, wherein the dataset pertaining to the admissions comprises admission data of the applicants in the plurality of business schools having data of business schools preferred by the applicants, interview status data of the applicant, and an outcome data;
read the datasets stored in the database to transform into a structured dataset through a reading module, wherein the structured datasets are subjected to a training operation by a machine learning module to provide a predictive model;
normalize the datasets and providing a corresponding value to each dataset stored in the database through a data normalization module, wherein the corresponding value provided to each dataset is re called to a range of 0 to 1;
map the first plurality of variables with the second plurality of variables to compare the profile of the applicant and profile of the business school through a variable-mapping module, wherein the variable-mapping module utilizes support vector machine regression (SVR) model to learn a plurality of weights of the first plurality of variables and map the first plurality of variables to the second plurality of variables;

create multi-label classification model by considering the profile of a prospect applicant as an input variable and the profile of the business school of the prospect applicant considered as a target variable through a multi-label classification module;

compute a first similarity score between the plurality of profiles of the applicants and the plurality of profiles of the business schools through a similarity module, wherein the similarity module utilizes a K-nearest Neighbor algorithm to extract data pertaining to similar applicants and business schools; and;

compute a second similarity score by utilizing data pertaining to a plurality of admission transactions accomplished by the business schools through a transaction-based matrix module, wherein the transaction-based matrix module utilizes the K-nearest Neighbor algorithm to extract the data pertaining to similar applicants and business schools.

8. The system according to claim 7, wherein the variable-mapping module utilizes a predefined mapping dictionary for mapping the first plurality of variables to the second plurality of variables.

9. The system according to claim 7, wherein the similarity module comprises a first similarity matrices and a second similarity matrices, wherein the first similarity matrices for applicants comprises a similarity score for each profile of the applicant and the second similarity matrices for each profile of the business school.

10. The system according to claim 7, wherein the similarity module utilizes a measure of similarity for computing the first similarity score.

11. The system according to claim 7, wherein the transaction-based matrix module comprises a first plurality of algorithms to assign similar business schools to the similar applicants.

12. The system according to claim 7, wherein the processor is further configured to provide a priority order of the recommended business schools through a second plurality of algorithms.

13. A device in a network, comprising:

a non-transitory storage device having embodied therein one or more routines operable to recommend a plurality of business schools based on an assessment of a plurality of profiles of applicants and a plurality of profiles of business schools; and one or more processors coupled to the non-transitory storage device and operable to execute the one or more routines, wherein the one or more routines include:

a storing module to store a plurality of datasets pertaining to a plurality of applicants, a plurality of business schools, and a plurality of admissions in a database, wherein the dataset pertaining to the applicant comprises profiles of the applicants having a first plurality of variables, wherein the dataset pertaining to the business schools comprises profiles of the business schools having a second plurality of variables, wherein the dataset pertaining to the admissions comprises admission data of the applicants in the plurality of business schools having data of business schools preferred by the applicants, interview status data of the applicant, and an outcome data;

a reading module to read the datasets stored in the database to transform into a structured dataset, wherein the structured datasets are subjected to a training operation by a machine learning module to provide a predictive model;

a data normalization module to normalize the datasets and providing a corresponding value to each dataset stored in the database, wherein the corresponding value provided to each dataset is rescaled to a range of 0 to 1;

a variable-mapping module to map the first plurality, of variables with the second plurality of variables to compare the profile of the applicant and profile of the business school, wherein the variable-mapping module utilizes support vector machine regression (SVR) model to learn a plurality of weights of the first plurality of variables and map the first plurality of variables to the second plurality of variables;

a multi-label classification module to create multi-label classification model by considering the profile of a prospect applicant as an input variable and the profile of the business school of the prospect applicant considered as a target variable;

a similarity module to compute a first similarity score between the plurality of profiles of the applicants and the plurality of profiles of the business schools, wherein the similarity module utilizes a K-nearest Neighbor algorithm to extract data pertaining to similar applicants and business schools; and a transaction-based matrix module to compute a second similarity score by utilizing data pertaining to a plurality of admission transactions accomplished by the business schools, wherein the transaction-based matrix module utilizes the K-nearest Neighbor algorithm to extract the data pertaining to similar applicants and business schools.

14. The device according to claim 13, wherein the variable-mapping module configured to utilize a predefined mapping dictionary for mapping the first plurality of variables to the second plurality of variables.

15. The device according to claim 13, wherein the similarity module comprises a first similarity matrices and a second similarity matrices, wherein the first similarity matrices for applicants comprises, a similarity score for each profile of the applicant and the second similarity matrices for each profile of the business school.

16. The device according to claim 13, wherein the similarity module configured to utilize a measure of similarity for computing the first similarity score.

17. The device according to claim 13, wherein the transaction-based matrix module comprises a first plurality of algorithms to assign similar business schools to the similar applicants.

18. The device according to claim 13, comprises a second plurality of algorithms to provide a priority order of the recommended business schools.

* * * * *